US006861382B2

(12) United States Patent  
Abukawa

(10) Patent No.: US 6,861,382 B2
(45) Date of Patent: Mar. 1, 2005

(54) SINTERED SILICON NITRIDE AND SILICON NITRIDE TOOL

(75) Inventor: Kohei Abukawa, Aichi (JP)

(73) Assignee: NGK Spark Plug Co., Ltd., Aichi (JP)

(*) Notice: Subject to any disclaimer, the term of this patent is extended or adjusted under 35 U.S.C. 154(b) by 0 days.

(21) Appl. No.: 10/295,894

(22) Filed: Nov. 18, 2002

(65) Prior Publication Data

US 2003/0096695 A1 May 22, 2003

(30) Foreign Application Priority Data

Nov. 16, 2001 (JP) ......................................... 2001-351996

(51) Int. Cl.⁷ ............................................ C04B 35/587
(52) U.S. Cl. ..................................... 501/97.2; 501/97.3
(58) Field of Search .............................. 501/97.2, 97.3; 901/97.1, 97.2, 97.3

(56) References Cited

U.S. PATENT DOCUMENTS

| 5,780,374 A | * | 7/1998 | Kawai et al. ............... 501/97.1 |
| 5,804,523 A | * | 9/1998 | Oda et al. .................. 501/97.2 |
| 5,914,286 A | * | 6/1999 | Collin et al. ............... 501/97.4 |
| 5,919,719 A | * | 7/1999 | Sato et al. ................. 501/97.2 |
| 5,961,907 A | * | 10/1999 | Yamagiwa et al. ......... 264/162 |

FOREIGN PATENT DOCUMENTS

| EP | 0 727 399 A2 | 8/1996 |
| EP | 0 784 038 A2 | 7/1997 |
| JP | 10-203874 | 8/1998 |
| JP | 11-268957 | 10/1999 |
| JP | 2001-10864 | 1/2001 |
| JP | 2001-19556 | 1/2001 |

OTHER PUBLICATIONS

European Search Report for EP 02 25 7927 dated Mar. 30, 2004.

* cited by examiner

Primary Examiner—Karl Group
(74) Attorney, Agent, or Firm—Sughrue Mion, PLLC

(57) ABSTRACT

Sintered silicon nitride and a silicon nitride tool. The mean major axis length, the mean minor axis length, and the aspect ratio, represented by (mean major axis length/mean minor axis length) of constituent sintered silicon nitride grains in a silicon nitride tool are controlled, and the thermal conductivity and/or fracture toughness Kc thereof are enhanced, thereby providing a tool having a cutting edge which is not prone to chipping.

12 Claims, 4 Drawing Sheets

SINTERED SILICON NITRIDE AND SILICON NITRIDE TOOL

BACKGROUND OF THE INVENTION

1. Field of the Invention

The present invention relates to sintered silicon nitride and a silicon nitride tool, and more particularly, to sintered silicon nitride having high mechanical strength and resistance to thermal shock; and providing, even when employed to produce a high-speed milling cutter for working ductile cast iron, a cutter having a cutting edge which is not prone to chipping, thereby attaining excellent tool life, and to a silicon nitride tool formed of the sintered silicon nitride.

2. Description of the Related Art

Silicon nitride, having excellent resistance to chemicals (acids) and heat resistance to high-temperature molten metal, is employed to form crucibles and nozzles. In addition, silicon nitride is inert to the living body, and thus is employed as a biological material for producing, for example, prosthetic joints.

Since sintered silicon nitride, which is produced by sintering in the presence or absence of an additive, is an insulator, the sintered silicon nitride is employed as a substrate of a multi-layer substrate or as insulative material included in Si transistors. Sintered silicon nitride finds a variety of applications, including heater substrates, brake mechanisms for an elevator, and blades for gas turbines by virtue of its low thermal expansion coefficient and high thermal shock strength; and applications such as cutting tools and bearings by virtue of its high wear resistance.

Conventionally, silicon nitride tools have been employed as cutting tools for turning ordinary cast iron (FC; ferrous cast) materials, particularly for turning at comparatively low cutting rates of about 500 m/min.

In recent years, a decrease in weight of automobile parts generally made of FC material is envisioned in order to reduce automobile fuel consumption. Accordingly, there is an increasing demand for ductile cast iron (FCD; ferrous cast, ductile) materials which can provide, as compared with FC materials, thin and lightweight parts. Furthermore, in order to work such parts at low cost and high efficiency, cutting must be performed at high speed.

Sintered silicon nitride is known to have high mechanical strength and toughness and is employed in a tool for cutting FC materials. In this regard, Japanese Patent Application Laid-Open (Kokai) No. 11-268957 discloses a silicon-nitride-based cutting tool said to have high mechanical strength and toughness, a cutting edge which does not chip during cutting (turning) of FC materials, and a long tool life.

3. Problems to be Solved by the Invention

However, when FCD material (having mechanical strength higher than that of FC material) is cut with a sintered silicon nitride tool, the mechanical strength and fracture toughness thereof is insufficient, thereby causing chipping of cutting edges. Thus, there has been a problem that, when used to cut FCD material, the cutting edges of the silicon nitride cutting tool disclosed in the aforementioned Japanese Patent Application Laid-Open (kokai) No. 11-268957 become chipped, resulting in a problematically short tool life.

Chipping of a cutting edge is also induced by thermal cracking caused by concentration of heat generated in the cutting edge during high-speed working. In order to prevent concentration of heat generated during working and induced thermal cracking, the thermal conductivity of silicon nitride must be increased. Even though thermal cracking occurs, chipping of the cutting edge of the tool can be prevented so long as propagation of cracking can be prevented. In other words, by increasing fracture toughness of silicon nitride at an initial stage of crack propagation, chipping of the tool can be prevented, thereby attaining a long tool life, even though thermal cracking occurs.

In this regard, Japanese Patent Application Laid-Open (kokai) No. 2001-10864 discloses a silicon nitride material of enhanced thermal conductivity produced by reducing the amounts of aluminum and oxygen which are prone to form a solid solution in silicon nitride grains. Japanese Patent Application Laid-Open (Kokai) No. 2001-19556 discloses a silicon nitride material of enhanced thermal conductivity produced by controlling the ratio $SiO_2/Re_2O_3$ (Re: rare earth element) in the grain boundary phase and by crystallizing the grain boundary phase.

However, when thermal conductivity above is enhanced, propagation of thermal cracking caused by thermal expansion and shrinkage of silicon nitride during high-speed milling involving repeated thermal shock is not completely suppressed. Thus, problematically, a satisfactory effect for preventing the propagation of thermal cracking can be attained only when the fracture toughness at an initial stage of propagation of cracking is enhanced together with thermal conductivity.

SUMMARY OF THE INVENTION

The present invention has been accomplished in order to solve the aforementioned problems, and an object of the present invention is to provide sintered silicon nitride having excellent mechanical strength relating to crack generation; enhanced thermal conductivity closely relating to generation and propagation of thermal cracking of a silicon nitride base material, as compared with the case of low-speed turning of conventional ordinary cast iron; and enhanced fracture toughness relating to resistance to propagation of cracking. Another object of the invention is to provide a silicon nitride tool made of the sintered silicon nitride.

In order to attain the aforementioned objects, the present invention provides (1) sintered silicon nitride that is advantageously used for a cutting tool, comprising silicon nitride grains having a mean major axis length of 0.45–0.75 $\mu$m; a mean minor axis length of 0.20–0.40 $\mu$m; and an aspect ratio, represented by (mean major axis length)/(mean minor axis length), of at least 1.7.

Generally, when a ceramic material contains minute grains and the grains are present uniformly throughout the material, the size of defects and residual stress in the microcrystalline structure, which defects or residual stress may decrease mechanical strength, can be reduced to thereby enhance mechanical strength. However, if the grain size is reduced excessively, the effect of deflecting (deflection effect) propagation of cracking generated in the ceramic material cannot be fully attained. In such case, fracture toughness decreases, and the life after generation of thermal cracking is shortened, thereby increasing chipping and shortening tool life (tool life will be described below). Thus, appropriate control of the major axis length and minor axis length of beta ($\beta$) silicon nitride grains together with decreasing the mean grain size thereof are important in order to maintain mechanical strength and fracture toughness of the sintered silicon nitride.

The mean major axis length and the mean minor axis length are controlled to 0.45–0.75 $\mu$m and 0.20–0.40 $\mu$m, respectively, in order to assure both mechanical strength and fracture toughness of the above sintered silicon nitride. When the mean major axis length is at least 0.45 μm and the mean minor axis length is at least 0.20 μm, fracture toughness increases, thereby attaining sufficient resistance to propagation of cracking, whereas when the mean major axis length is 0.75 μm or less and the mean minor axis length is 0.40 μm or less, homogeneity in grain size is attained, thereby suppressing residual stress and the size of defects, leading to satisfactory mechanical strength.

In the present invention, the mean major axis length and the mean minor axis length are determined in the following manner. Specifically, a cross-section of a core portion of the relevant sintered compact is photographed under a scanning electron microscope (SEM). Then, the photograph is subjected to image analysis. The longest width of one grain is taken as the major axis length of the grain (X in FIG. 1), and the major axis lengths of 500 to 1,000 grains are averaged, to thereby provide the mean major axis length. The longest width of one grain in a direction normal to the major axis is taken as the minor axis length of the grain (Y in FIG. 1), and the minor axis lengths of grains are similarly averaged, to thereby provide the mean minor axis length.

In another embodiment (2), the present invention provides sintered silicon nitride as described in (1) above, which has a thermal conductivity (at 25° C.) of at least 50 W/m·K.

When the thermal conductivity is high, generation and propagation of thermal cracking can be prevented effectively. Thus, higher thermal conductivity is considered to be effective for prolonging the tool life. In fact, when the thermal conductivity is at least 50 W/m·K, heat generated in sintered silicon nitride sufficiently diffuses by thermal conduction, to thereby prevent chipping at the tool edge. Therefore, in the present invention, the thermal conductivity is preferably 50 W/m·K or more.

In yet another embodiment (3), the present invention provides sintered silicon nitride as described in (1) or (2) above, which has a fracture toughness Kc as measured by the IF method (Indentation Fracture method) under an indentation load of 9.8 N of at least 5.0 MPa·m$^{0.5}$.

Resistance to propagation of cracking at an initial stage of thermal crack generation has been studied by determining the fracture toughness Kc of samples by the IF method (JIS R1607 (1994)) under an indentation load of 9.8 N (small crack length), and comparing the results. The results indicate that a silicon nitride tool base of long tool life for use in high-speed milling of FCD material exhibits a fracture toughness Kc higher than that of a silicon nitride tool base of short tool life. More specifically, when the fracture toughness Kc is 5.0 MPa·m$^{0.5}$ or higher, propagation of thermal cracking can be remarkably suppressed.

In yet another embodiment (4), the present invention provides a silicon nitride tool formed of sintered silicon nitride as described in any one of (1) to (3) above.

Specifically, the tool formed of sintered silicon nitride as described in (1) above contains silicon nitride grains having a mean major axis length of 0.45–0.75 μm; a mean minor axis length of 0.20–0.40 μm; and an aspect ratio, represented by (mean major axis length)/(mean minor axis length), of at least 1.7. Thus, the tool exhibits both excellent mechanical strength and excellent fracture toughness and is resistant to both chipping of a cutting edge nose and propagation of cracking.

When the sintered silicon nitride has a thermal conductivity (at 25° C.) of at least 50 W/m·K, heat concentrated in the tip during working sufficiently diffuses, to thereby prevent chipping of the edge. Thus, a long-life tool can be provided.

When the sintered silicon nitride has a fracture toughness Kc of 5.0 MPa·m$^{0.5}$ or higher, propagation of thermal cracking can be remarkably suppressed, and the life after generation of thermal cracking, the most significant determinant to tool life, can be prolonged. Resistance to propagation of cracking at an initial stage of thermal crack generation has been studied by determining the fracture toughness Kc of samples by the IF method (JIS R1607 (1994)) under an indentation load of 9.8 N (small crack length), and comparing the results. The results show that, when the sintered silicon nitride has a fracture toughness Kc of 5.0 MPa·m0.5 or higher, propagation of thermal cracking is remarkably suppressed, and life after the generation of thermal cracking is prolonged.

DESCRIPTION OF REFERENCE NUMERALS

Figure 1:
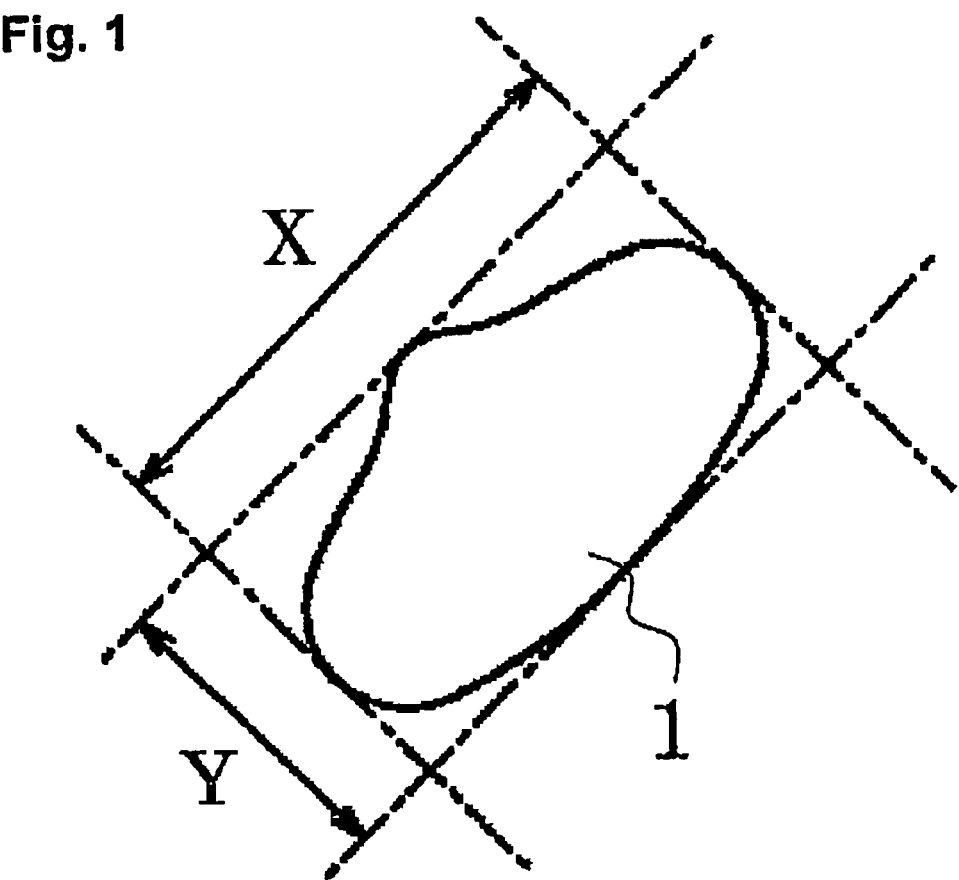
FIG. 1 is a sketch illustrating a method for determining the major axis length and the minor axis length of crystal grains.

1: crystal grain
2: silicon nitride cutting tip
3: chamfer
X: major axis of crystal grain
Y: minor axis of crystal grain
A: chamfer width
B: chamfer angle

DETAILED DESCRIPTION OF THE INVENTION

Preferred embodiments of the sintered silicon nitride and the silicon nitride tool according to the present invention will next be described. However, the present invention should not be construed as being limited thereto.

MgO powder (1 wt. %), and $Yb_2O_3$ powder (2 wt. %) (as sintering agents, average particle size: 1.0 μm) and α-$Si_3N_4$ powder (as balance, average particle size: 1.0 μm) were weighed, to prepare a raw material, and the raw material was mixed in a $Si_3N_4$-lined pot using $Si_3N_4$ balls and ethanol as a solvent for 96 hours, to thereby obtain a slurry.

In this preparation of the raw material, amounts of the MgO and $Yb_2O_3$ powders can be varied from 0.5–2% by weight and 1–3% by weight, respectively. The average particle sizes of MgO, $Yb_2O_3$ and α-$Si_3N_4$ powder can be varied from 0.3–1.5 μm. Instead of $Yb_2O_3$, other rare earth metal oxides such as $Er_2O_3$ and $Y_2O_3$ can be used, however a sum of MgO and at least one rare earth element should be in the range of 0.8–3.0% by volume. Inevitable impurities such as $Al_2O_3$ may be contained in the raw materials so long as the sintered product having a thermal conductivity (at 25° C.) of at least 50 W/m·K and a fracture toughness Kc as measured by the IF method under an indentation load of 9.8 N of at least 5.0 MPa·m$^{0.5}$ is attained. However, the impurities should be controlled to less than 0.5% by volume, since they tend to reduce not only the fracture toughness but also the thermal conductivity of the cutting tool tip. This is because phonons are prevented from quickly transferring through grain-boundaries at which impurities gather.

These additives of MgO, rare earth metal oxide and inevitable impurities form a crystalline phase and a glassy phase for binding the beta silicon nitride grains that are changed from the alpha silicon nitride grains of the raw material under the above firing and sintering.

The slurry was applied through a 325-mesh sieve, and (5.0% by weight of an organic binder (microwax dissolved in ethanol) was mixed/to the resultant slurry. The resultant mixture was spray-dried to attain a granulated powder.

The thus-granulated powder was press-molded into a compact having a shape as defined in ISO standards SNGN 120412 and, subsequently the compact was dewaxed in a heating apparatus at 600° C. under nitrogen (1 atm) for 60 minutes.

The thus-dewaxed compact was subjected to primary sintering of 1100–1300° C. for 30–120 minutes. Then, the compact was placed in a sagger made of silicon nitride under nitrogen (1 atm) and maintained under a middle holding firing at a temperature of 1650–1750° C. and duration of 1–45 minutes, as shown in Table 1.

Notably, this middle holding firing is important, according to the invention, with respect to a sintered silicon nitride ceramic having both a high thermal conductivity and a high fracture toughness and specifically a cutting tool tip (or rather insert) made thereof for cutting the FCD material. A role of this middle holding firing is to form as many nuclei of beta ($\beta$)-$Si_3N_4$ as possible from the alpha ($\alpha$)-$Si_3N_4$. If the temperature is increased to 1800° C. or more without this middle holding firing duration of at least 1 minute, the number of nuclei (or rather seeds) of beta-$Si_3N_4$ formed in this middle holding firing is limited, and the subsequently sintered silicon nitride will have large sized beta-$Si_3N_4$ grains only without reasonably small sized beta-$Si_3N_4$ grains as contemplated by this invention.

Subsequently, the compact was heated to 1,800–1,900° C., and maintained at 1,800–1,900° C. for 60–120 minutes.

Finally, the compact was subjected to secondary sintering through hot isostatic pressing (HIP) at 1,600–1,800° C. for 180 minutes under nitrogen (1,000 atm).

Figure 2:
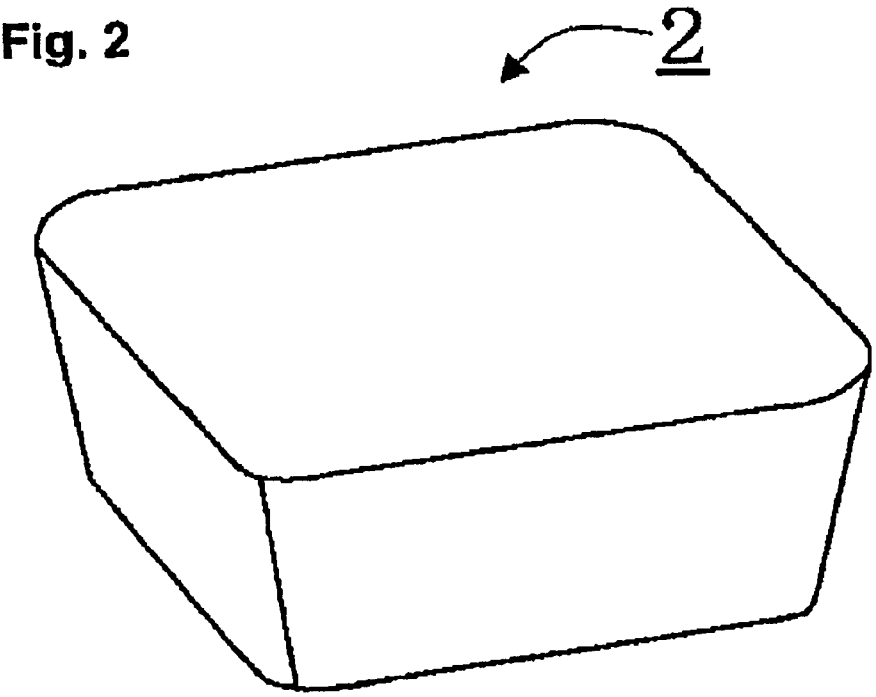
FIG. 2 is a view of a cutting tip produced in the Examples of the present invention.

The thus-obtained sintered silicon nitride was cut into pieces that were grinded into a shape as defined in ISO standards SPGN 120412, to thereby yield cutting tips (Example Nos. A to E). Comparative cutting tools (Nos. F to J) were produced in the same manner. FIG. 2 shows the shape of silicon nitride tips produced in the Examples.

The upper face of each of the thus obtained tips (Examples and Comparative Examples) was mirror-polished, and the fracture toughness of a portion serving as a cutting edge was determined in accordance with JIS R1607 (1994) under an indentation load of 9.8 N. Table 1 shows the results. The mean major axis length and the mean minor axis length of the silicon nitride grains were obtained by observing and photographing a cross-section of the relevant sintered compact under a scanning electron microscope (SEM) (×5,000) and performing image analysis of the photograph. The results are shown in Table 1. Each of the tips having a shape as defined in the aforementioned SPGN 120412 was ground to a diameter $\phi$ (inscribed circle) of 10 mm and a thickness of 10 mm, and thermal conductivity of the test piece (at 25° C.) was calculated using the laser flash method described in JIS R1611 (1994). The results are shown in Table 1.

Figure 3:
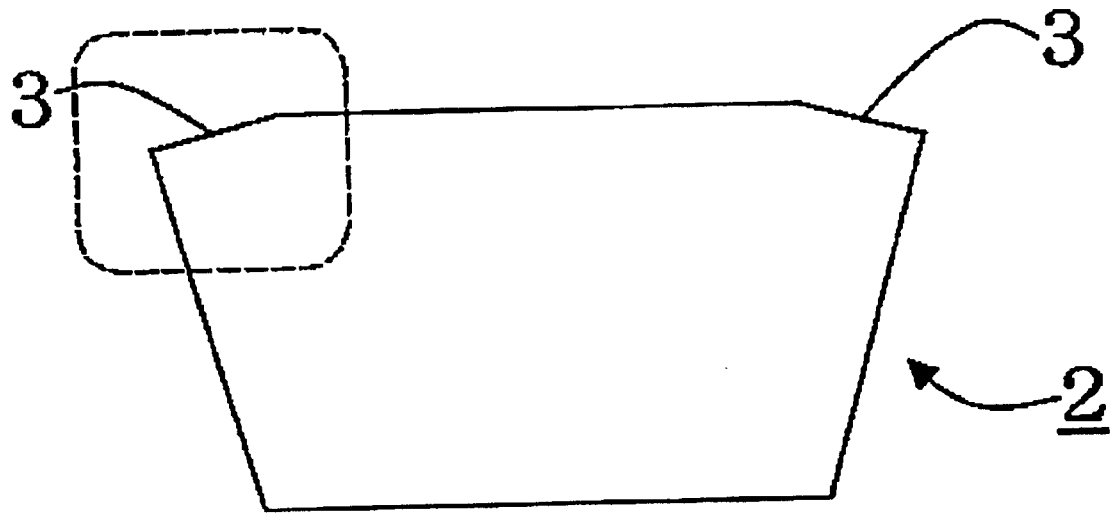
FIG. 3 is a side view of the tip shown in FIG. 2.
Figure 4:
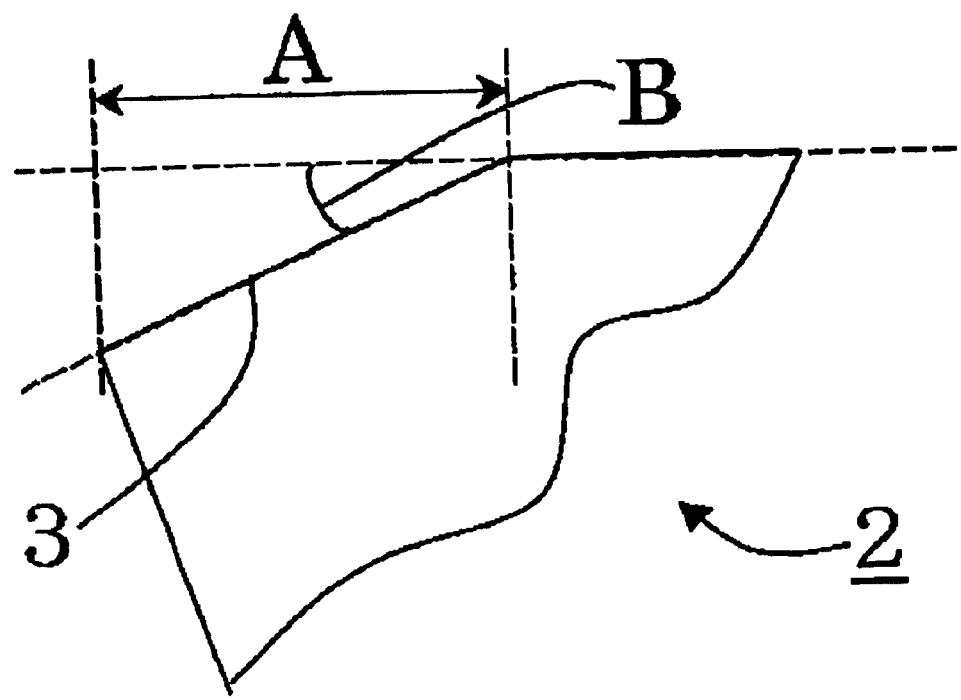
FIG. 4 is an enlarged view of a chamfered portion of the tip shown in FIG. 3

The cutting edge of each of the cutting tips of the Examples and Comparative Examples was chamfered as shown in FIGS. 3 and 4 (chamfer width A: 0.1 mm, chamfer angle B: 25°). The thus-chamfered cutting tip was attached to a tool 4 equipped with holders, and cutting was performed under the working conditions described below. The number of impact repetitions at which the cutting edge nose of the tips was chipped was determined. Table 1 shows the results.

Figure 5:
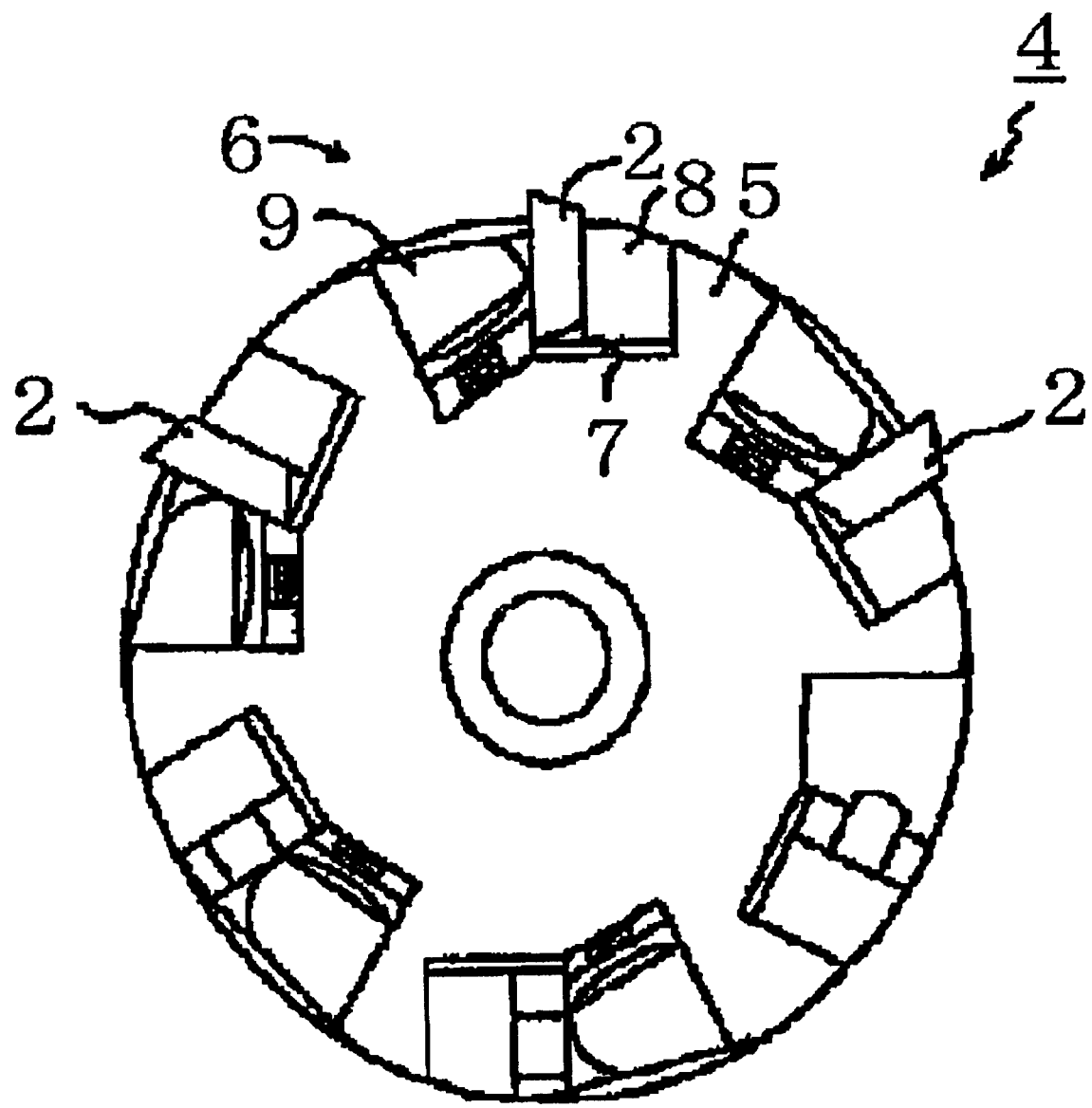
FIG. 5 is a top plan view of a milling cutter body to which the cutting tools of the Examples are attached.
Figure 6:
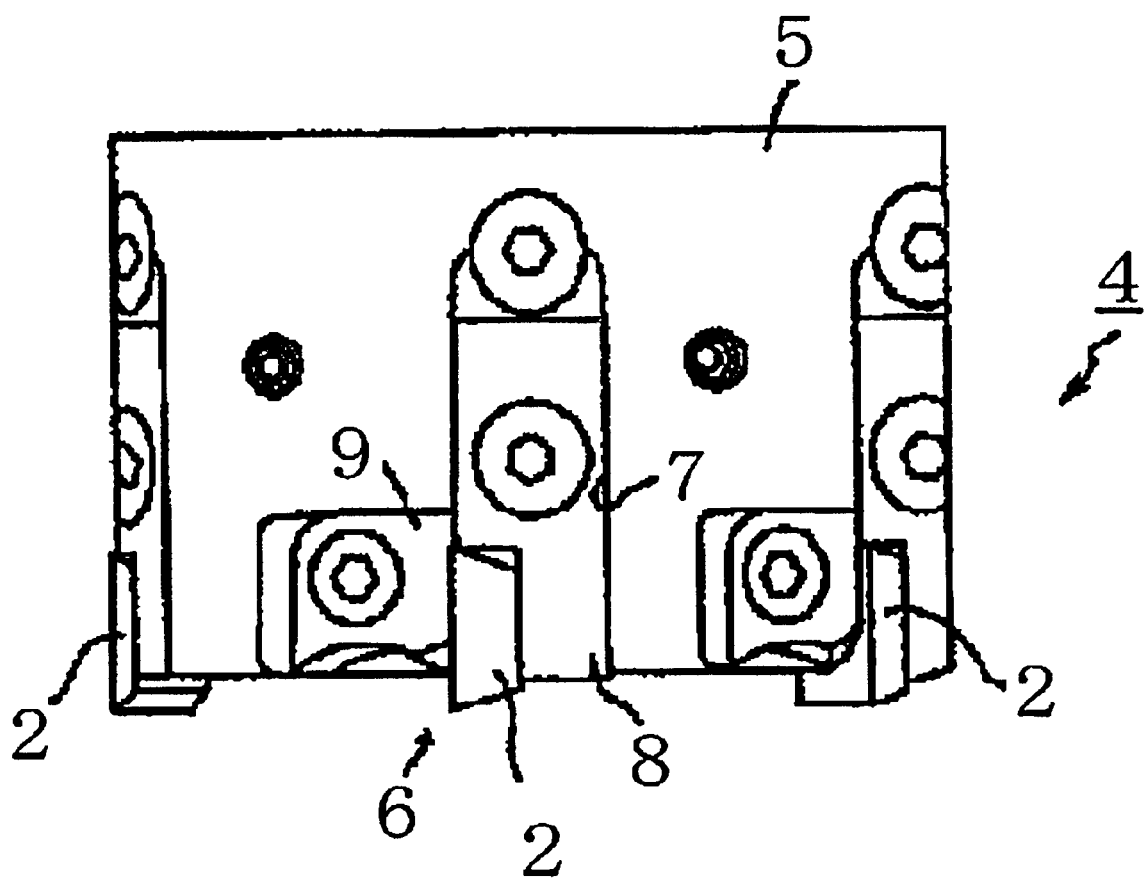
FIG. 6 is a front view of FIG. 5.

Next, a holder-equipped tool assembly to which the above cutting tips are attached will be described. As shown in FIG. 5, the holder-equipped tool assembly (milling cutter) 4 of the present embodiment has a generally columnar cutter body (holder) 5. Six cutting sections 6 are provided along the periphery of the end portion thereof (to face a surface to be machined). Specifically, six attachment depressions 7 are provided along the periphery of the end portion of the holder 5. In each attachment depression 7, the above cutting tip 2, an alloy-steel cartridge 8 for attaching the cutting tip 2, an alloy-steel wedge 9, etc., are disposed, to thereby form the corresponding cutting section 6. For the purpose of clearly showing the structure of the milling cutter, two of the six cutting sections 6 are shown without cutting tips 2 but including a wedge 9, and one of the eight cutting sections 6 is shown without cutting tip 2 or wedge 9.

Cutting Conditions:

Workpiece: FCD 600 (ductile cast iron) (JIS G5502 (1989));

Cutting speed: 500 m/min;

Feed rate: 0.2 mm/cutting edge;

Depth of cut: 2.0 mm;

Cutting with oil: wet;

Cutter employed: Φ 100, single cutting edge

TABLE 1

| | | Middle holding temperature | | Mean major axis length | Mean minor axis length | Aspect ratio | 25° C. Thermal conductivity | Fracture toughness Kc (9.8 N) | Impact repetitions to chipping |
|---|---|---|---|---|---|---|---|---|---|
| | No. | ° C. | min | (X $\mu$m) | (Y $\mu$m) | (X/Y) | (W/m · K) | (MPa · $m^{0.5}$) | (times) |
| Ex. | A | 1,680 | 1 | 0.57 | 0.26 | 2.2 | 50.1 | 5.1 | 5,100 |
| | B | 1,700 | 1 | 0.55 | 0.30 | 1.8 | 53.2 | 5.0 | 7,120 |
| | C | 1,700 | 1 | 0.62 | 0.28 | 2.2 | 55.1 | 5.3 | 4,880 |
| | D | 1,700 | 30 | 0.60 | 0.35 | 1.7 | 66.4 | 6.0 | 7,010 |
| | E | 1,720 | 30 | 0.65 | 0.33 | 2.0 | 66.8 | 6.0 | 6,560 |
| Comp. Ex. | F | 1,700 | 60 | 0.70 | 0.31 | 2.3 | 63.0 | 4.2 | 4,240 |
| | G | 1,600 | 30 | 0.50 | 0.29 | 1.7 | 40.2 | 4.2 | 3,500 |
| | H | 1,800 | 1 | 0.80 | 0.40 | 2.0 | 45.0 | 4.8 | 2,150 |

TABLE 1-continued

| No. | Middle holding temperature °C. | min | Mean major axis length (X μm) | Mean minor axis length (Y μm) | Aspect ratio (X/Y) | 25° C. Thermal conductivity (W/m · K) | Fracture toughness Kc (9.8 N) (MPa · m$^{0.5}$) | Impact repetitions to chipping (times) |
|---|---|---|---|---|---|---|---|---|
| I | 1,600 | 1 | 0.81 | 0.23 | 2.2 | 37.1 | 4.7 | 1,100 |
| J | 1,800 | 60 | Not evaluated due to decomposition of silicon nitride | | | | | |

As shown in Table 1, the cutting tips of Examples A to E exhibited a fracture toughness Kc (at an initial stage of propagation of cracking, indentation load: 9.8 N) of 5.0 MPa·m$^{0.5}$ or higher and a thermal conductivity (at 25° C.) of at least 50 W/m·K, leading to reduction in percent chipping of a cutting edge of the tool caused by cutting.

Effects of the Invention:

As described above, the sintered silicon nitride of the present invention exhibits a thermal conductivity ($\geqq 53$ W/m·K) and a fracture toughness Kc which are enhanced as compared with those of conventional sintered silicon nitride, by specifying the major axis and minor axis of constituent silicon nitride gains. Thus, the sintered silicon nitride exhibits excellent thermal shock resistance.

In the silicon nitride tool of the present invention, enhanced thermal conductivity and enhanced fracture toughness Kc prevent propagation of cracking of the tool during high-speed milling and reduce the occurrence of chipping of the cutting edge of the tool due to thermal cracking. Thus, the tool life for use in high-speed milling can be prolonged, and efficiency of high-speed working can be enhanced while the cost thereof can be reduced.

It should further be apparent to those skilled in the art that various changes in form and detail of the invention as shown and described above may be made. It is intended that such changes be included within the spirit and scope of the claims appended hereto.

This application is based on Japanese Patent Application No. 2001-351996 filed Nov. 16, 2001, the disclosure which is incorporated herein by reference in its entirety.

What is claimed is:

1. Sintered silicon nitride containing silicon nitride grains having a mean major axis length of 0.45–0.75 μm; a mean minor axis length of 0.20–0.40 μm; and an aspect ratio, represented by (mean major axis length)/(mean minor axis length), of at least 1.7, wherein said silicon nitride contains MgO and at least one rare earth element, a sum of MgO and rare earth metal oxides being in the range of 0.8–3.0% by volume.

2. Sintered silicon nitride as claimed in claim 1, having thermal conductivity (at 25° C.) of at least 50 W/m·K.

3. Sintered silicon nitride as claimed in claim 1, having a fracture toughness Kc as measured by the IF method under an indentation load of 9.8 N of at least 5.0 MPa·m$^{0.5}$.

4. Sintered silicon nitride as claimed in claim 2, having fracture toughness Kc as measured by the IF method under an indentation load of 9.8 N of at least 5.0 MPa·m$^{0.5}$.

5. A silicon nitride tool formed of sintered silicon nitride as claimed in claim 1.

6. A silicon nitride tool formed of sintered silicon nitride as claimed in claim 2.

7. A silicon nitride tool formed of sintered silicon nitride as claimed in claim 3.

8. The sintered silicon nitride as claimed in claim 1, wherein said silicon nitride contains 0.5–2.0% by weight of MgO and 1–3% by weight of $Yb_2O_3$.

9. The sintered silicon nitride as claimed in claim 1, wherein all of said silicon nitride grains are beta silicon nitrides.

10. A silicon nitride tool formed of sintered silicon nitride as claimed in claim 1, wherein said silicon nitride tool is used for cutting a FCD material.

11. Sintered silicon nitride containing silicon nitride grains having a mean major axis length of 0.45–0.75 μm; a mean minor axis length of 0.20–0.40 μm; and an aspect ratio, represented by (mean major axis length)/(mean minor axis length), of at least 1.7, wherein said silicon nitride contains MgO in an amount of 0.5–2.0% by weight and 1–3% by weight of $Yb_2O_3$.

12. A silicon nitride tool formed of sintered silicon nitride as claimed in claim 11.

* * * * *